United States Patent [19]

Baroï et al.

[11] 4,455,102

[45] Jun. 19, 1984

[54] SYSTEM FOR ASSEMBLING AND FIXING PANELS

[75] Inventors: Stefan I. Baroï, 8, Avenue de Miremont, 1206 Geneva, Switzerland; Bernard Duchenet, Thonon-les-Bains, France

[73] Assignee: Stefan Ionel Baroi, Geneva, Switzerland

[21] Appl. No.: 304,550

[22] Filed: Sep. 21, 1981

[30] Foreign Application Priority Data

Sep. 26, 1980 [FR] France .................................. 8020981

[51] Int. Cl.³ .............................................. F16B 5/06
[52] U.S. Cl. .................................. 403/173; 403/231; 52/285
[58] Field of Search ............... 403/241, 173, 170, 205, 403/295, 292, 231; 52/285

[56] References Cited

U.S. PATENT DOCUMENTS 3,715,136  2/1973  Yoshida .......................... 403/292 X
3,874,133  4/1975  Silvius ................................. 52/285

FOREIGN PATENT DOCUMENTS 2257090   5/1974  Fed. Rep. of Germany .
 971567   8/1950  France ................................. 52/285
1506412  11/1967  France .
1529364   5/1968  France .
2141371   1/1973  France .
1044840  10/1966  United Kingdom ............... 403/292
2041145   9/1980  United Kingdom ............... 403/231

Primary Examiner—Andrew V. Kundrat
Attorney, Agent, or Firm—Young & Thompson

[57] ABSTRACT

An assembly system of panels comprises panels (1) on two opposed edges (2) of which notches (3) are provided. A linkage part (7) connects four adjacent panels (1). This linkage part comprises a flat wall (8) intended to be entered into the notches (3) of the panels and guiding members (9) abutting against the faces of the panels (1). This system permits the mounting of structures for storing purposes forming boxes which are closed on at least four sides.

2 Claims, 2 Drawing Figures

SYSTEM FOR ASSEMBLING AND FIXING PANELS

To assemble arrangement of furniture, shelves, etc. for example by means of prefabricated elements, it is necessary on the one hand to reduce the number of parts to assemble and on the other hand to create an easy system for the user who has to make the assembly.

The present invention has for its object such a panel assembly for creating furniture which distinguishes itself by the fact that it comprises panels having, on two opposed edges, at least two notches and by the fact that linkage parts, comprising a planar wall having a thickness corresponding to the width of the said notches, as well as guiding members intended to rest against the faces of the panels, are provided to cooperate each with several different panels.

The attached drawing shows schematically and by way of example one embodiment of the assembling system according to the present invention.

Figure 1:
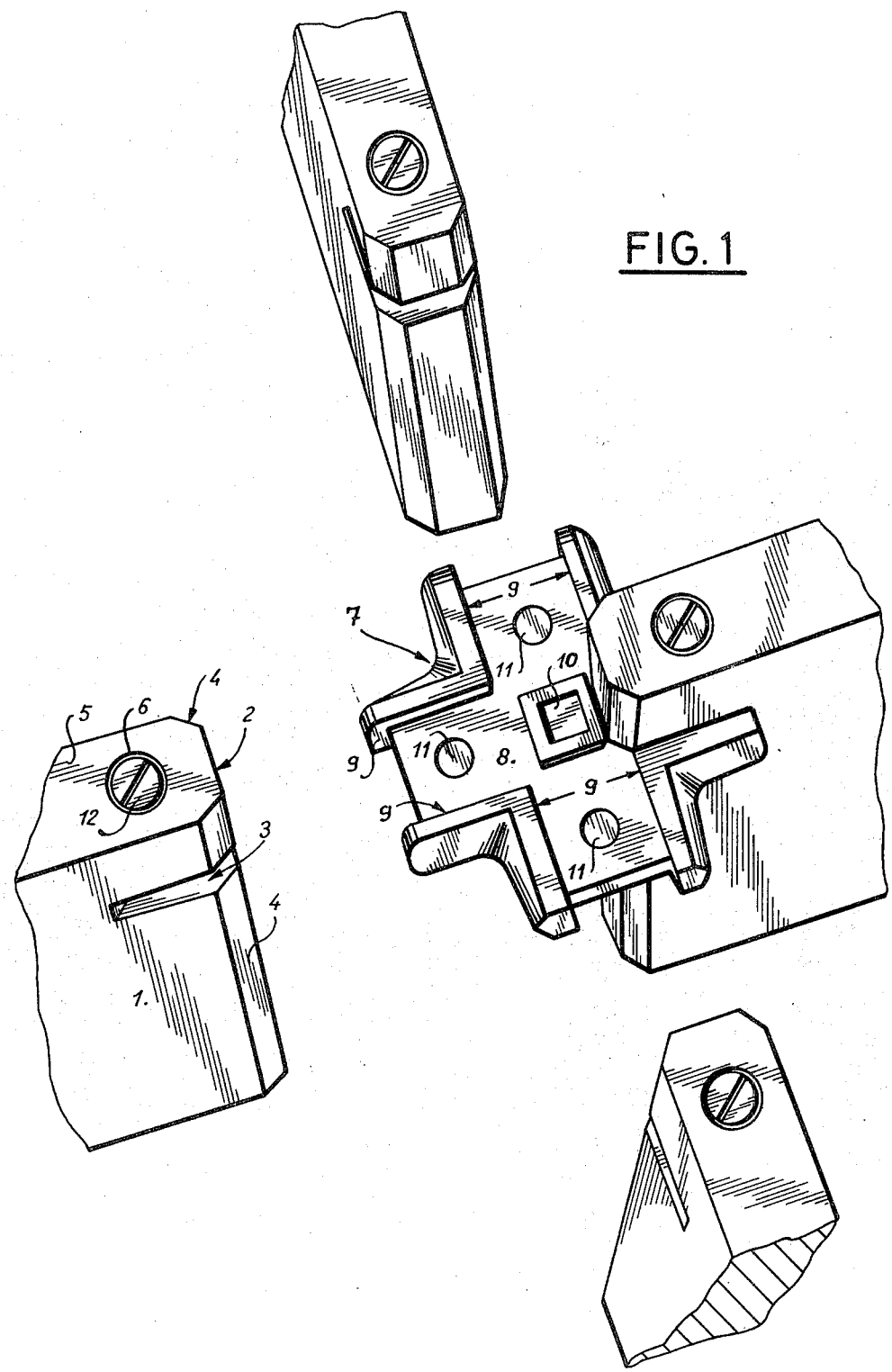
FIG. 1 is a perspective view of a linkage part and of four panels, only one of them being coupled to the linkage part.
Figure 2:
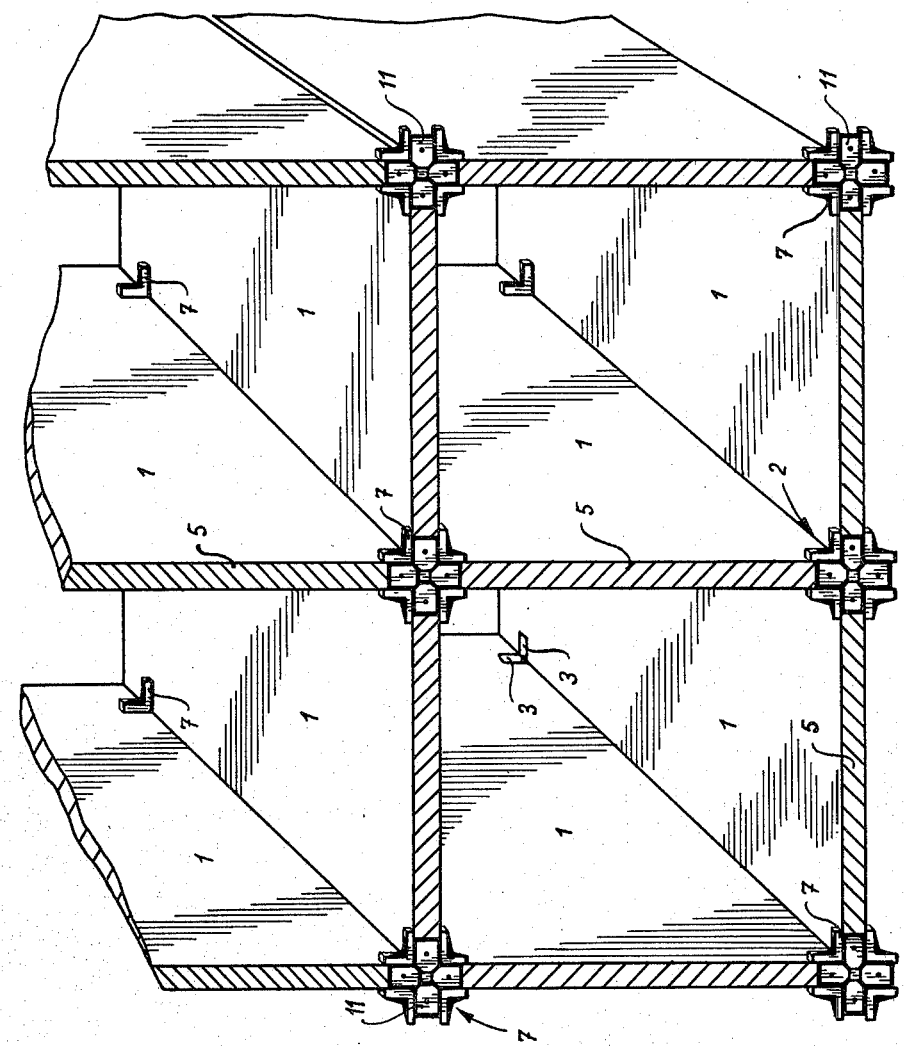
FIG. 2 shows schematically a storing structure made according to the present system.

The assembling and fixing system for panels, particularly to make storing arrangements, is original in that each panel 1 has on two of its opposite edges 2 at least two notches 3 extending in a plane perpendicular to the said edge 2.

The edges 2 of the panels 1 provided with notches are chamfered so as to form two resting faces.

The notches 3 are located near the two other edges 5 of the panels 1. In FIG. 1, the panels are only partially shown, that is why only one notch 3 is visible.

A hole 6 is provided in the edges 5 of the panel and connects this edge 5 to the corresponding notch 3.

The assembling system comprises further linkage parts 7 presenting a planar wall 8 the thickness of which corresponds to the width of the notches 3 as well as guiding faces 9, the spacing of which corresponds to the width of the panels 1. This linkage part 7 has therefore seen from above the general shape of a recessed cross. A central abutment 10 has lateral faces intended to enter into contact with the edges 2 of the panels 1.

These linkage parts 7 have in the example shown holes 11 intended to give passage to locking means 12 formed by screws or pins for example.

To assemble the panels one slides the notches 3 of the panels over the wall 8 of the linkage part 7 between the guiding walls 9 up to the moment when the edge 2 of each panel abuts against the central abutment 10 of a linkage part 7. The locking member 12 is then put in place in the holes 6 and 11 to lock the assembly.

When assembled the rest faces 4 of two panels form an angle of 90° between them and are in contact the one with the other. This is important since the rigidity of the mounted assembly is greatly enhanced and above all the individual boxes of the arrangement of furniture or structure obtained are closed at the corners.

At the sides of the assembly thus produced, a portion of the linkage parts 7 projects and it is possible to use the holes of these parts to fix the produced structure against a wall for example.

A partial void in the central abutment 10 can also be provided so as to make holes permitting also to fix the assembly against a wall.

The linkage parts 7 are for example made by injection of plastic material so that their manufacturing cost can be lowered by mass production.

The machining to be done to the panels, chamfers and notches, is limted so that the structure is of a reduced cost.

It is evident that the finish of the panels can vary according to the desired use. They can be made out of wood, rough, painted, plated, laminated; out of glass, metal etc.

The reduced number of the elements of the system enables a easy and quick mounting of the assembly by the user.

It is evident that this assembling system enables the production of dismountable and modifiable structures which is very important.

The linkage parts 7 can have a central hole for the fixing onto at least one wall of the assembled structure.

Furthermore linkage parts having a T or L shape can be provided to fix three or two panels, respectively. These parts are used particularly on the side of the corners of the produced structures.

One can also provide for cruciform linkage parts, the central wall of one wing of which would be omitted. In this way it is possible by entering a panel between the guiding walls 9 of the grooved wing, to form a start at 90° for another portion of the structure. Corner structures can thus be produced.

Of course many modifications can be made by these skilled in the art, the above system being described only by way of non limitative example, without departing from the scope of the invention.

I claim:

1. Assembly system for panels, comprising a plurality of panels each having notches in two opposite edges, and linkage parts interconnecting at least two panels, each linking part having a flat wall having a thickness corresponding to the width of said notches, each linkage part having guiding members that rest against the faces of the panels when said flat walls are disposed in said notches, each linkage part having a central abutment that contacts the edge of the panels it links, the corners of the edges of the panels being chamfered to form resting faces, said resting faces of two adjacent panels at right angles to each other being in contact with each other, and holes through the edges of the panels and through said flat walls of said linkage parts, said holes through the panels being parallel to said edges of the panels having said chambers and being adapted to receive locking means passing therethrough and through the holes through said flat walls.

2. A system as claimed in claim 1, and a hole through said central abutment for securing said system to a wall.

* * * * *